United States Patent [19]

Fish, Jr.

[11] 4,216,353
[45] Aug. 5, 1980

[54] ADAPTIVE MULTIPLEX BLEND CONTROL FOR STEREO DECODER TO MAINTAIN SIGNAL TO NOISE RATIO

[75] Inventor: Lawrence W. Fish, Jr., Chenango, N.Y.

[73] Assignee: McIntosh Laboratory, Inc., Binghamton, N.Y.

[21] Appl. No.: 24,911

[22] Filed: Mar. 27, 1979

[51] Int. Cl.$^2$ ............................................... H04H 5/00
[52] U.S. Cl. .................................. 179/1 GJ; 455/303
[58] Field of Search ........... 179/1 GJ, 1 GM; 325/36, 325/474

[56] References Cited

U.S. PATENT DOCUMENTS

| | | | |
|---|---|---|---|
| 3,673,342 | 6/1972 | Muller | 179/1 GJ |
| 3,823,268 | 7/1974 | Modafferi | 179/1 GJ |
| 4,029,906 | 6/1977 | Takahashi | 179/1 GJ |

Primary Examiner—Douglas W. Olms
Attorney, Agent, or Firm—Pollock, Vande Sande & Priddy

[57] ABSTRACT

An integrated circuit stereo decoder includes a blend control input terminal. The DC control voltage on this input terminal determines channel separation. During multiplex FM reception of multi-path signals, the signal strength signal has AM and a DC components. By detecting and amplifying the AC component and adding it to the DC component of the signal strength signal, in phase opposition, the presence of multi-path can be made to reduce the resulting combined signal strength signals which, in turn, is connected to the blend control terminal. Accordingly, the presence of multi-path reduces separation to maintain signal to noise ratio and reduce distortion.

7 Claims, 3 Drawing Figures

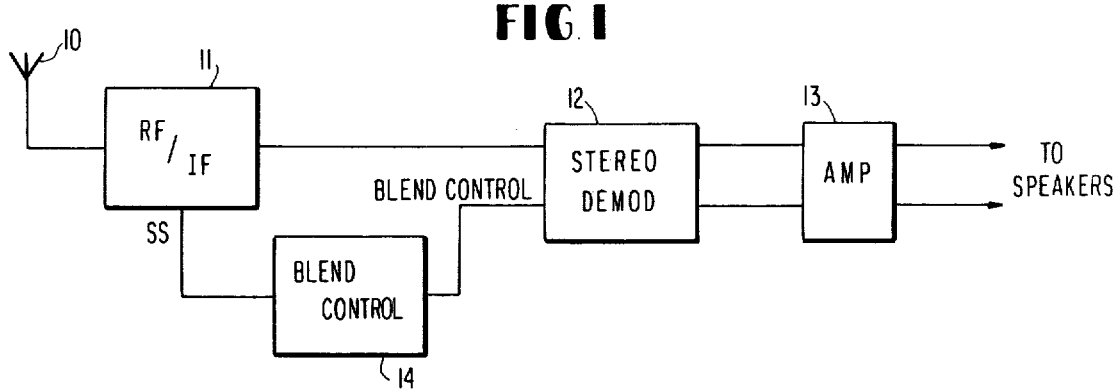
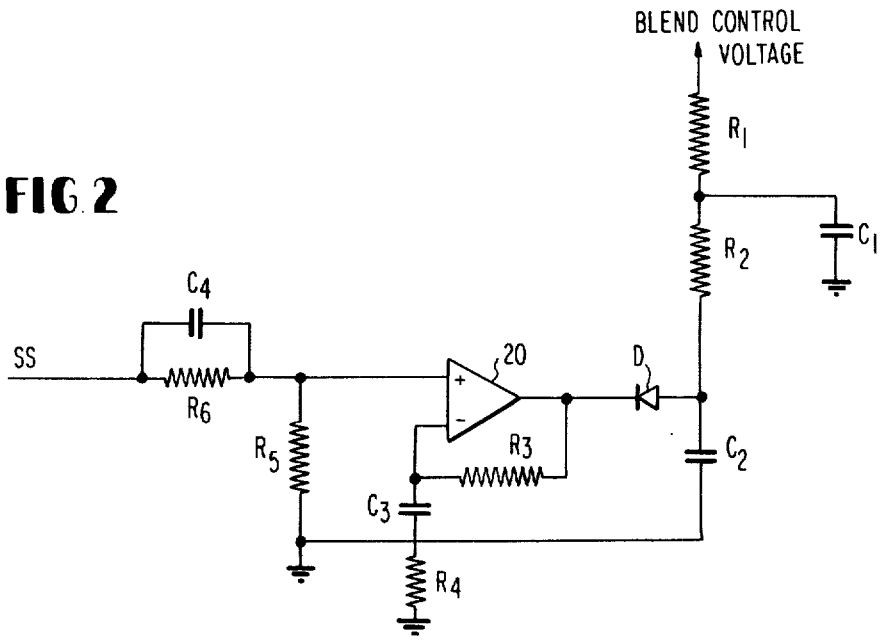
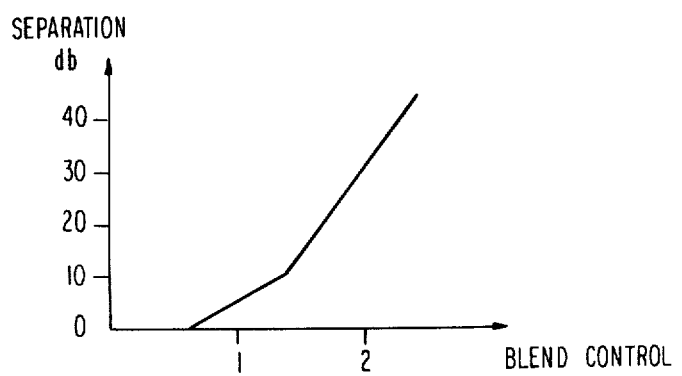

ADAPTIVE MULTIPLEX BLEND CONTROL FOR STEREO DECODER TO MAINTAIN SIGNAL TO NOISE RATIO

FIELD OF THE INVENTION

The present invention relates to a blend control circuit for use in generating a blend control voltage useful in trading off channel separation for reduced distortions and improved signal to noise ratio in receivers designed to receive stereo multiplexed signals.

BACKGROUND OF THE INVENTION

For the audiophile, the advent of FM stereo multiplexed broadcasting, and the growth of the industry in equipment for receiving such signals, has been a great boon. For many years the art has been aware of the greater realism of stereo sound reproduction as opposed to monaural reproduction. With the advent of stereo multiplexed transmission, a broadcasting station, using a single broadcasting channel, can now broadcast the two necessary signals for stereo sound reproduction. With the authorization of this type of broadcasting, the hi-fi industry has made available to consumers equipment necessary to receive and decode or demodulate this type of signal. In these receivers, as is the case generally in high fidelity sound reproduction equipment, a prime requirement is to maintain the signal to noise ratio such that sound reproduction is not disturbed by the presence of noise. There are a number of well-known techniques for maintaining adequate signal to noise ratio and thus assuring satisfactory sound reproduction.

On source of receiver distortion and noise which is particularly troublesome is termed multi-path, which is a short way of describing the phenomena in which the desired signal is received over at least two different paths and hence one arrives slightly later than the other. The delayed signal causes distortion and noise which must be suppressed.

The stereo decoder is particularly sensitive of any source of noise, and multi-path noise in particular, since the decoding process involves detecting a wider bandwidth than the bandwidth detected for mono reception and hence, the signal to noise ratio is reduced.

SUMMARY OF THE INVENTION

In accordance with the invention, a control voltage is derived from the signal strength signal and related thereto in such a fashion that normal separation is maintained with adequate signal strength levels. The presence of multipath produces a signal strength which is amplitude modulated, and this modulation is employed in the control voltage generation so as to reduce the control voltage and thereby reduce separation. The reduction of separation maintains a signal to noise ratio by precluding noise and distortion produced by reception of the stereo L minus R multiplex signal.

BRIEF DESCRIPTION OF THE DRAWINGS

The present invention will now be described in further detail so as to enable those skilled in the art to make and use the same, when taken in conjunction with the attached drawings in which like reference characters identify identical apparatus and in which:

FIG. 1 is a block diagram of a stereo FM receiver employing the present invention;

FIG. 2 is a schematic illustration of the blend control voltage generator of FIG. 1; and FIG. 3 plots channel separation versus blend control voltage for the stereo demodulator (Motorola TCA4500A).

DETAILED DESCRIPTION OF THE INVENTION

As shown in FIG. 1, a typical stereo multiplex receiver includes a conventional antenna 10, coupled to conventional r-f/i-f circuits 11. The detected output of the i-f stage (from the FM discriminator, in the frequency band 20 Hz–53 kHz) comprises the composite FM stereo output, which is coupled to a stereo demodulator 12, i.e., the Motorola TCA4500A. The stereo demodulator 12 provides a pair of outputs, a left channel and a right channel to a conventional stereo amplifier 13. The conventional stereo amplifier 13 provides a pair of outputs to drive a conventional stereo speaker system.

In addition to this signal path, the conventional r-f/i-f circuits 11 provide a signal strength control signal which is coupled on a conductor SS to a blend control generator 14. The blend control generator 14, in turn, provides a blend control voltage as a second input to the conventional stereo demodulator 12.

In operation, assuming adequate signal strength levels, the particular broadcast to which the receiver will respond is selected in a conventional fashion by manually controlling the r-f/i-f circuits 11. Reception of an FM stereo signal produces a pair of outputs from r-f/i-f circuits 11 including composite stereo output signal coupled to one input of the stereo demodulator 12 and a signal strength control signal SS, whose level is dependent upon the signal strength received by the r-f/i-f circuits 11. Assuming adequate signal strength level, the blend control generator 14 is arranged to produce a blend control voltage which allows the stereo demodulator 12 to provide maximum separation. As the signal strength decreases, however, the blend control voltage produced by the blend control generator 14 reduces the separation of the signal provided by the stereo demodulator 12 in such a fashion as to maintain adequate levels of signal to noise ratio. In particular, multi-path effects produce an amplitude modulated component on the signal strength control signal. These amplitude modulated components are employed in the blend control generator 14 so as to reduce the blend control voltage in such a fashion as to reduce the separation produced by the stereo demodulator 12.

In one embodiment of the invention, the stereo demodulator 12 was a Motorola TCA4500A. This is a single chip FM stereo demodulator which is supplied in a 16-pin package. One of the pins in this 16-pin package is a blend control input voltage. FIG. 3 illustrates the blend control functions by plotting blend control voltage as a function of separation produced by this particular stereo demodulator.

FIG. 2 is a schematic of the blend control generator 14 which will produce a suitable blend control voltage. As shown in FIG. 2, the signal strength control input is coupled to a junction of capacitor C4 and a resistor R6, which are connected in parallel and through a resistor R5 to ground. The junction of resistors R5 and R6 is coupled to the positive input of an operational amplifier 20, which may comprise an LM 301, which is a voltage follower having a DC gain less than 1. The negative input terminal of amplifier 20 is coupled through capacitor R3 and resistor R4 to ground, and also coupled via a resistor R3 to its output terminal. The output terminal of the amplifier 20 is also coupled to the cathode of a diode D whose anode is coupled to ground through a capacitor C2. The anode of diode D is also coupled to ground through the series combination of a resistor R2 and a capacitor C1. Finally, a resistor R1 is connected at the junction of resistor R2 and capacitor C1, and provides, at its opposite terminal, the blend control voltage for connection to the stereo demodulator 12.

Resistors R5 and R6 form a voltage divider and thus determine the proportion of the signal strength control signal which will be coupled to the input terminal of amplifier 20. The AC gain of the amplifier 20 is determined by the resistors R3, R4 and capacitor C3. Capacitors C1 and C2 are filter capacitors as will be explained below.

In one particular embodiment of the invention, employing the Motorola TCA4500A stereo demodulator, the blend control voltage, when varied between 0 and 0.7 v, produces no separation, and at 3.2 volts produces full separation (40 to 50 dB).

For slowly varying signal strength levels, a quasi-DC level at the output of amplifier 20 establishes a quasi-DC blend control voltage which determines separation in light of the signal strength level in such a fashion that as signal strength level increases, so does the blend control voltage and the resulting separation produced by the stereo demodulator 12. The relative values of R5 and R6 determine at what signal strength level the blend control voltage will reach 3.2 volts, which will produce the maximum separation.

Desirably, the time constant on the signal strength detector (C4, R6) is kept relatively short so that in the presence of multi-path effects, amplitude modulation is present on the signal strength control signal. The amplifier 20 amplifies the AC and DC components, the DC gain is less than 1, the AC gain is greater than 1 and controlled in the manner recited above.

The AC gain is chosen so that the AC component of the signal strength control voltage in the presence of severe multi-path, when amplified by amplifier 20, is sufficient to offset the DC component so that the blend control voltage is reduced so as to preclude separation. The amplified and detected AC component of the signal strength control signal is added to the DC output of the amplifier 20, out of phase. Accordingly, the AC component, present by reason of multi-path, reduces the resultant blend control voltage. Thus, in the presence of multi-path separation is reduced and the signal to noise ratio is maintained so as to reduce the audible distortion produced by multi-path in a stereo demodulator.

The AC component of the signal strength control signal is amplified by amplifier 20, half-wave rectified by diode D and applied to demodulator 12 through the filter ($C_1$, $C_2$, $R_2$). In the presence of several multi-path, the AC gain is sufficient to hold the blend control input terminal of demodulator 12 at or below 0.7 v, which will preclude separation. This occurs since the half-wave rectified AC component is negative in polarity because of the diode polarity. As signal strength increases, the AC component is reduced, the AC output of op am 20 falls and the blend control voltage rises, allowing more and more separation.

It should be noted that as the severity of multi-path increases, the AC component of the signal strength signal also increases, which has the effect of reducing blend control voltage and consequently, channel separation.

What is claimed is:

1. In a stero multiplex receiver, including an r-f, i-f section generating a signal strength control signal, and a stereo demodulator with an input terminal for channel separation control, a device for maintaining signal to noise ratio and reducing distortion in the presence of multi-path effect comprising:
  voltage generator means responsive to said signal strength control signal for generating a quasi-DC voltage with amplitude inversely related to AC components in said signal strength signal caused by multi-path, and
  means for coupling said quasi-DC voltage to said channel separation input terminal.

2. The apparatus of claim 1 wherein said voltage generator means comprises an operational amplifier having DC gain less than 1, and an AC gain greater than 1,
  with an input terminal coupled to said signal strength control signal, and an output terminal coupled to said means for coupling.

3. The apparatus of claim 2 which further includes half-wave rectifier means connected between said operational amplifier output terminal and said means for coupling.

4. The apparatus of claim 2 in which said means for coupling includes a filter.

5. A stereo multiplex receiver which is arranged to adaptively maintain low distortion and adequate signal to noise ratio in the presence of multi-path effects comprising;
  r-f and i-f circuit means for generating a composite FM stereo signal and a signal strength control signal in response to radiated signals,
  a stereo demodulator having an input terminal coupled to said detected composite FM stereo signal and a channel separation control input terminal, said stereo demodulator including a pair of output terminals for coupling left and right channel signals to a stereo amplifier,
  voltage generator means responsive to said signal strength control signal for generating a quasi-DC voltage of amplitude inversely related to AC components in said signal strength control signal, and having an output terminal coupled to said channel separation control input terminal of said stereo demodulator.

6. The apparatus of claim 4 wherein said voltage generator means includes operational amplifier having an input coupled to said signal strength control signal, said operational amplifier having a DC gain less than 1, and an AC gain or more than 1, said operational amplifier having output terminal coupled to said channel separation control input terminal.

7. The apparatus of claim 5 in which a diode is connected between said amplifier output terminal and said channel separation control input terminal.

* * * * *